United States Patent
Son et al.

(10) Patent No.: US 9,338,766 B2
(45) Date of Patent: May 10, 2016

(54) APPARATUS AND METHOD FOR PERFORMING SAFE COMMUNICATION IN WIRELESS COMMUNICATION SYSTEM

(71) Applicant: Samsung Electronics Co. Ltd., Suwon-si, Gyeonggi-do (KR)

(72) Inventors: Yeong-Moon Son, Yongin-si (KR); Rakesh Taori, Suwon-si (KR); Hyun-Jeong Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 28 days.

(21) Appl. No.: 13/690,311

(22) Filed: Nov. 30, 2012

(65) Prior Publication Data

US 2013/0143583 A1 Jun. 6, 2013

(30) Foreign Application Priority Data

Dec. 2, 2011 (KR) .................. 10-2011-0128263

(51) Int. Cl.
  *H04W 72/04* (2009.01)
  *H04W 72/08* (2009.01)
  *H04W 92/20* (2009.01)
  *H04W 72/12* (2009.01)

(52) U.S. Cl.
  CPC .......... *H04W 72/0406* (2013.01); *H04W 72/08* (2013.01); *H04W 72/1278* (2013.01); *H04W 72/1231* (2013.01); *H04W 92/20* (2013.01)

(58) Field of Classification Search
  CPC ..... H04W 16/14; H04W 16/24; H04W 28/02; H04W 28/16; H04W 56/00; H04W 72/0406; H04W 72/08; H04W 72/1278; H04W 72/1231
  USPC ............ 455/435.1, 438, 444, 452.1; 370/252, 370/329, 312
  See application file for complete search history.

(56) References Cited

U.S. PATENT DOCUMENTS

| 7,751,817 | B2 | 7/2010 | Kim et al. | |
|---|---|---|---|---|
| 8,103,310 | B1 * | 1/2012 | Srinivas et al. | 455/561 |
| 2002/0122461 | A1 * | 9/2002 | Hervey et al. | 375/132 |
| 2003/0099221 | A1 * | 5/2003 | Rhee | 370/338 |

(Continued)

FOREIGN PATENT DOCUMENTS

| EP | 2 378 826 A1 | 10/2011 |
|---|---|---|
| KR | 10-2009-0107950 A | 10/2009 |

OTHER PUBLICATIONS

Samsung, Interference Measurement for Downlink CoMP, 3GPP TSG RAN1 Meeting #67, Nov. 14-18, 2011, R1-114228.

(Continued)

*Primary Examiner* — Nathan Taylor
(74) *Attorney, Agent, or Firm* — Jefferson IP Law, LLP

(57) ABSTRACT

A base station, a wireless terminal and a communication method of a wireless communication system are provided. The base station includes a receiver for receiving a signal from a wireless terminal or another base station, a transmitter for transmitting a signal to the wireless terminal or the another base station, and a controller for generating resource scheduling or control information for communication of the wireless terminal in a cell including at least two base stations included in a moving path of the wireless terminal and for transmitting the generated resource scheduling or control information to the wireless terminal and at least one of the base stations included in the cell.

36 Claims, 11 Drawing Sheets

(56) References Cited

U.S. PATENT DOCUMENTS

| | | | |
|---|---|---|---|
| 2008/0045220 A1* | 2/2008 | Ishii et al. | 455/438 |
| 2009/0232013 A1* | 9/2009 | Kumpula et al. | 370/252 |
| 2009/0257398 A1 | 10/2009 | Koyanagi et al. | |
| 2010/0039951 A1* | 2/2010 | She et al. | 370/252 |
| 2010/0142482 A1 | 6/2010 | Lu et al. | |
| 2010/0197295 A1* | 8/2010 | Horangic | 455/422.1 |
| 2010/0197311 A1* | 8/2010 | Walldeen et al. | 455/444 |
| 2010/0220671 A1* | 9/2010 | Guillouard et al. | 370/329 |
| 2010/0291940 A1* | 11/2010 | Koo | H04B 7/024 455/450 |
| 2011/0058513 A1* | 3/2011 | Ai et al. | 370/312 |
| 2011/0206106 A1* | 8/2011 | Mallik | H04B 7/024 375/226 |
| 2011/0250892 A1* | 10/2011 | Gupta et al. | 455/437 |
| 2011/0268007 A1* | 11/2011 | Barany | H04B 7/024 370/312 |
| 2012/0015655 A1* | 1/2012 | Lee | 455/435.1 |
| 2012/0040619 A1* | 2/2012 | Zhu | 455/63.1 |
| 2012/0147805 A1* | 6/2012 | Kim et al. | 370/312 |
| 2012/0258720 A1* | 10/2012 | Tinnakornsrisuphap et al. | 455/442 |
| 2012/0294694 A1* | 11/2012 | Garot | 411/427 |
| 2013/0051214 A1* | 2/2013 | Fong et al. | 370/216 |
| 2013/0195000 A1* | 8/2013 | Shen et al. | 370/312 |
| 2013/0242920 A1* | 9/2013 | Wang | H04W 72/085 370/329 |

OTHER PUBLICATIONS

Samsung, CSI Feedback Mechanism for Multiple Transmission Points, 3GPP TSG RAN1 Meeting #67, Nov. 14-18, 2011, R1-114224.

* cited by examiner

APPARATUS AND METHOD FOR PERFORMING SAFE COMMUNICATION IN WIRELESS COMMUNICATION SYSTEM

PRIORITY

This application claims the benefit under 35 U.S.C. §119 (a) of a Korean patent application filed on Dec. 2, 2011 in the Korean Intellectual Property Office and assigned Serial No. 10-2011-0128263, the entire disclosure of which is hereby incorporated by reference.

BACKGROUND OF THE INVENTION

1. Field of the Invention

The present invention relates to an apparatus and method for performing communication in a wireless communication system. More particularly, the present invention relates to an apparatus and method for safely performing communication between a base station and a wireless terminal.

2. Description of the Related Art

Recently, with the increasing use of wireless terminals such as smart phones, large-volume data transmission services or mobile services of various natures are actively being developed. To provide such services, transmission and reception of control information between a base station and a wireless terminal have to be performed safely. However, communication between the base station and the wireless terminal may be interrupted due to link fluctuation, instant circulation of the wireless terminal, or polarization. When the wireless terminal fails to receive control information from the base station, correct operation may become difficult to achieve such that data transmission and reception may not be performed. Therefore, there is a need for a scheme for achieving safe communication between the base station and the wireless terminal.

The above information is presented as background information only to assist with an understanding of the present disclosure. No determination has been made, and no assertion is made, as to whether any of the above might be applicable as prior art with regard to the present invention.

SUMMARY OF THE INVENTION

An aspect of the present invention is to address at least the above-mentioned problems and/or disadvantages and to provide at least the advantages described below. Accordingly, an aspect of the present invention is to provide an apparatus and method for performing safe communication between a base station and a wireless terminal in a wireless communication system.

Another aspect of the present invention also is to provide an apparatus and method for performing safe communication between a base station and a wireless terminal by dualizing the base station which transmits control information to the wireless terminal.

According to an aspect of the present invention, a base station of a wireless communication system is provided. The base station includes a receiver for receiving a signal from a wireless terminal or another base station, a transmitter for transmitting a signal to the wireless terminal or the another base station, and a controller for generating resource scheduling or control information for communication of the wireless terminal in a cell including at least two base stations included in a moving path of the wireless terminal and for transmitting the generated resource scheduling or control information to the wireless terminal and at least one of the base stations included in the cell.

According to an aspect of the present invention, a base station of a wireless communication system is provided. The base station includes a receiver for receiving a signal from a wireless terminal or another base station, a transmitter for transmitting a signal to the wireless terminal or the other base station, and a controller for receiving resource scheduling or control information for communication of the wireless terminal from any one base station included in a cell including at least two base stations included in a moving path of the wireless terminal and for transmitting the received resource scheduling or control information to the wireless terminal.

According to an aspect of the present invention, a wireless terminal of a wireless communication system is provided. The wireless terminal includes a receiver for receiving a signal from base stations, a transmitter for transmitting a signal to the base stations, and a controller for simultaneously receiving resource scheduling or control information for communication of the wireless terminal from at least two base stations included in a cell including the at least two base stations included in a moving path of the wireless terminal to perform communication.

According to an aspect of the present invention, a wireless communication method of a wireless communication system is provided. The communication method includes generating resource scheduling or control information for communication of the wireless terminal in a cell including at least two base stations included in a moving path of a wireless terminal, and transmitting the resource scheduling or control information to the wireless terminal and at least one of the base stations included in the cell.

According to an aspect of the present invention, a communication method of a wireless communication system is provided. The communication method includes receiving resource scheduling or control information for communication of the wireless terminal from a base station included in a cell including at least two base stations included in a moving path of the wireless terminal, and transmitting the received resource scheduling or control information to the wireless terminal.

According to an aspect of the present invention, a communication method of a wireless communication system is provided. The communication method includes simultaneously receiving resource scheduling or control information for communication of the wireless terminal from at least two base stations included in a cell including the at least two base stations included in a moving path of the wireless terminal, and performing communication based on the resource scheduling or control information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
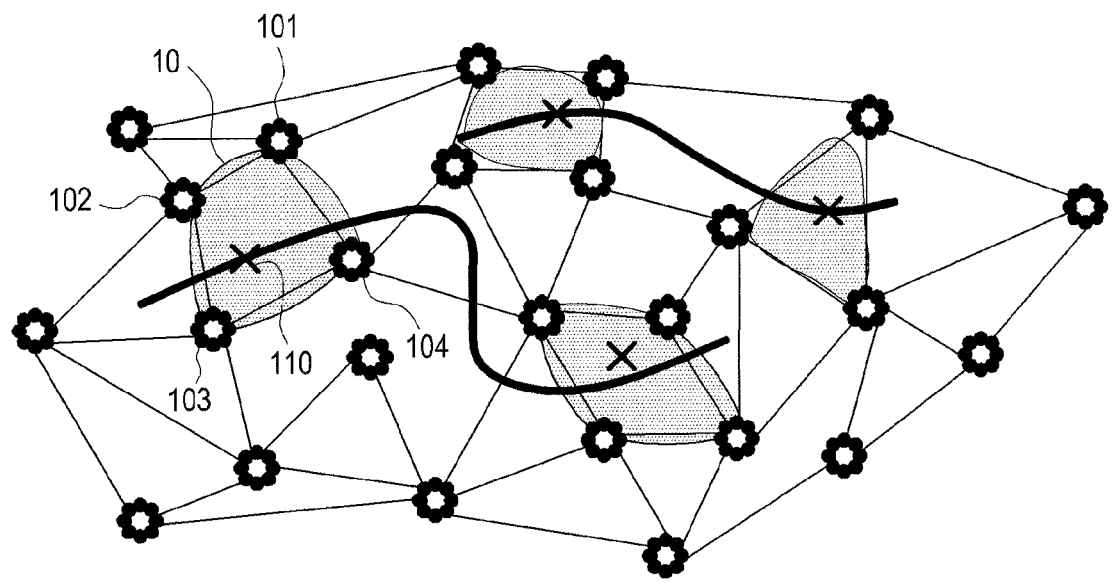
FIG. 1 is a diagram of a cloud cell according to an exemplary embodiment of the present invention.

FIG. 1 is a diagram of a cloud cell according to an exemplary embodiment of the present invention.

Referring to FIG. 1, an independent virtual cell is configured along a moving path of a wireless terminal 110. The independent virtual cell is referred to as a cloud cell 10. In the cloud cell 10, the wireless terminal 110 may receive information from multiple first through fourth base stations 101, 102, 103, and 104 which share information regarding the wireless terminal 110 and participate in scheduling for the wireless terminal 110 at the same time or with time intervals therebetween. The base stations 101, 102, 103, and 104 which form the cloud cell 10 are base stations having strong reception signal strength with respect to the wireless terminal 110. At least one of the multiple base stations 101, 102, 103, and 104 (for example, the base station 101) may be a cloud master.

The cloud master 101 performs control signaling with respect to the wireless terminal 110. The cloud master 101 provides, to the wireless terminal 110, information about resource scheduling of a base station which allocates Down Link (DL) or Up Link (UL) resources to the wireless terminal 110. The cloud master 101, upon receiving a channel measurement result with respect to neighboring base stations from the wireless terminal 110, updates information about the multiple base stations 102, 103, and 104 which form the cloud cell 10 based on the channel measurement result. The updated base station information is transmitted to the wireless terminal 110 and the multiple base stations 102, 103, and 104. The wireless terminal 110 and the multiple base stations 102, 103, and 104 also update information about the base stations 102, 103, and 104 which form the cloud cell 10.

According to another exemplary embodiment, the cloud master may be dualized into a Main Cloud Master (MCM) and at least one Auxiliary Cloud Masters (ACMs). Any of the multiple base stations 101, 102, 103, and 104 which form the cloud cell 10 may be an MCM, and another of the base stations may be ACMs. The MCM is in charge of control signaling, scheduling, and management with respect to the wireless terminal 110, and the ACM is in charge of control signaling or control message forwarding between the wireless terminal 110 and the MCM.

Figure 2A:
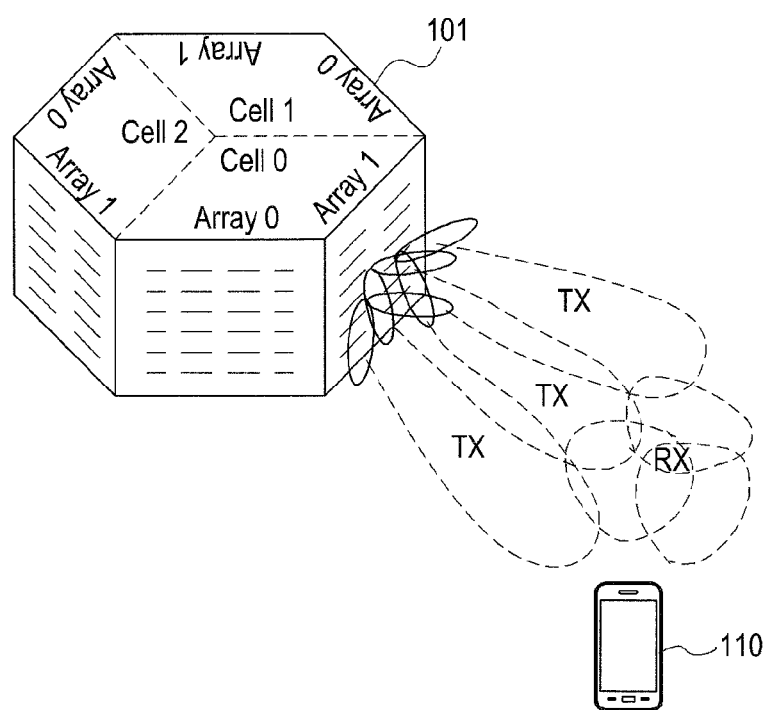
FIGS. 2A through 2C are diagrams of beam selection of a wireless terminal in a cloud cell according to an exemplary embodiment of the present invention.
Figure 2B:
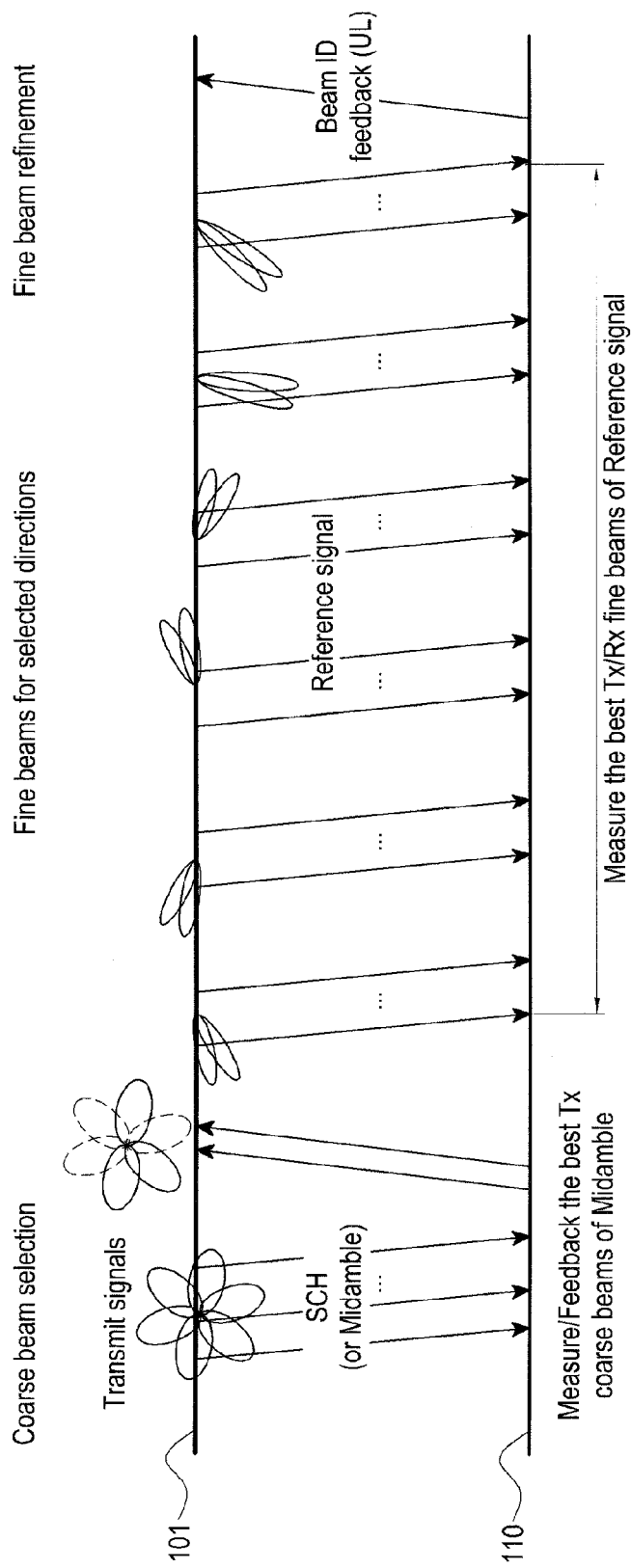
Figure 2C:
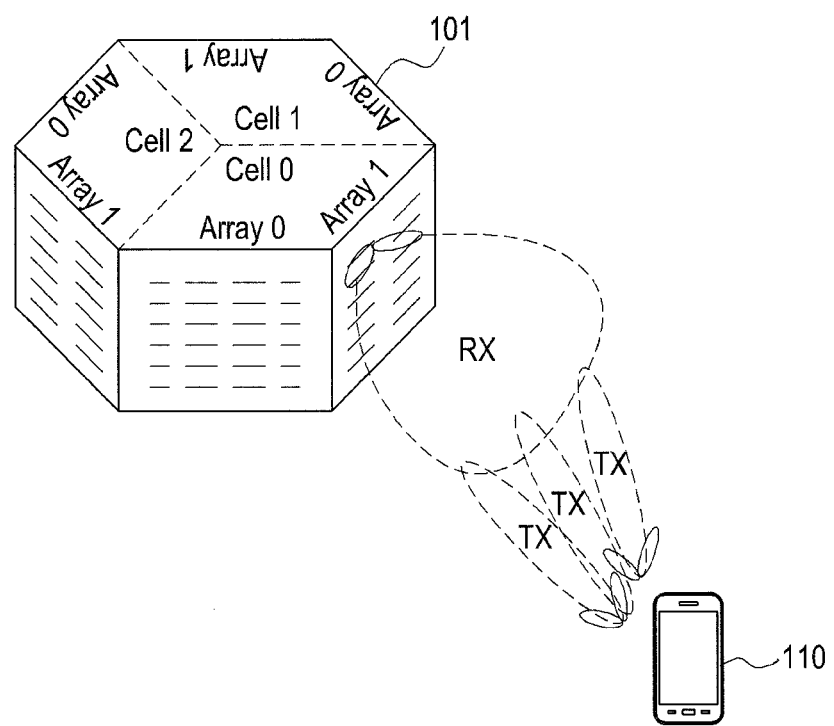

FIGS. 2A through 2C are diagrams for describing beam selection of a wireless terminal in a cloud cell according to an exemplary embodiment of the present invention.

Referring to FIGS. 2A-2C, the wireless terminal 110 should previously recognize a fine beam through DL beam selection to receive DL data from all the base stations 101, 102, 103, and 104 included in the cloud cell 10. While operations of the base station 101 of the cloud cell 10 and the wireless terminal 110 will be described below, such description may also be equally applied to the other base stations 102, 103, and 104 of the cloud cell 10.

Referring to FIG. 2A, the base station 101 transmits data, which can carry a broadcast message, while changing a DL transmission beam direction via an array antenna, and the wireless terminal 110 receives data while changing a reception beam. To obtain maximum data throughput between the base station 101 and the wireless terminal 110, the DL transmission beam of the base station 101 should be directed toward the wireless terminal 110, and the DL reception beam of an active array antenna of the wireless terminal 110 also should be directed toward the base station 101.

The wireless terminal 110, after directing the DL reception beam in one direction, attempts reception of DL transmission beams of the base station 101. The wireless terminal 110 receives a preamble including a beam IDentification (ID) through a Shared CHannel (SCH) or receives a message including a beam ID through a Broadcast CHannel (BCH).

This process is repeated while changing a DL reception beam. After completion of the repetition, a DL transmission beam having best signal strength, and a DL reception beam used by the wireless terminal 110 to receive the DL transmission beam having the best signal strength from the base station 101 are determined. The wireless terminal 110 reports the beam ID of the DL transmission beam having the best signal strength between the wireless terminal 110 and the respective base stations 101, 102, 103, and 104 to the respective base stations 101, 102, 103, and 104 to determine a DL transmission beam and a DL reception beam and prepare for transmission and reception of DL data.

The wireless terminal 110 reports a DL transmission beam determined between the base stations other than the cloud master and the wireless terminal 110 to the cloud master. This process is a beam forming process, which may be referred to as coarse beam selection.

For coverage expansion and reliable data transmission in optimization terms, the base station 101 and the wireless terminal 110 may perform a beam forming process, such as fine beam selection, to select a narrower beam than a beam width used in coarse beam selection.

Referring to FIG. 2B, in fine beam selection, a narrow beam, rather than a wide beam used in a SCH and a BCH in coarse beam selection, is used, and the base station 101 transmits a reference signal through each DL narrow transmission beam. The reference signal may be a midamble signal or its equivalent signal, and has a narrow beam ID. The wireless terminal 110 fixes the DL narrow reception beams and receives the DL narrow transmission beams to perform channel measurement, and changes the direction of the DL narrow reception beams. This process is repeated as many times as the number of DL narrow reception beams available in the wireless terminal 110. In this way, the wireless terminal 110 determines a DL narrow transmission beam having the best signal strength and a DL narrow reception beam used to receive the DL narrow transmission beam as in coarse beam selection, reports the DL narrow transmission beam to the respective base stations 101, 102, 103, and 104, and transmits and receives data between the wireless terminal 110 and the base stations 101, 102, 103, and 104 using the DL narrow transmission beam and the DL narrow reception beam. The wireless terminal 110 reports the DL narrow transmission beam determined between the wireless terminal 110 and the other base stations than the cloud master to the cloud master.

Referring to FIG. 2C, for a UL, as in the DL, a beam selection process is needed. Although the wireless terminal 110 may perform UL beam selection for all the base stations 101, 102, 103, and 104 of the cloud cell 10, to prevent power consumption and data throughput reduction, UL beam selection may be performed only between the wireless terminal 110 and the cloud master. The UL beam selection process is similar to the above-described coarse beam selection process, but beam selection is performed through ranging of the wireless terminal 110 instead of the SCH and the BCH. The wireless terminal 110 transmits a ranging code having an UL transmission beam ID to the base station 101 through the UL transmission beam, and transmits the ranging code while changing the direction of the UL transmission beam.

This process is repeated as many times as the number of UL reception beams of the base station 101. In FIG. 2C, the number of UL reception beams is one, and the first base station 101 is the cloud master. After completion of repetition, the base station 101 determines the UL transmission beam having the best signal strength among UL transmission beams of the wireless terminal 110, and determines a UL reception beam used to transmit the UL transmission beam having the best signal strength. The base station 101 informs the wireless terminal 110 of the UL transmission beam to be used for data transmission through a message such as RaNGe ACKnowledgement (RNG-ACK), thus finishing preparing for UL data transmission and reception between the wireless terminal 110 and the base station 101. In this state, as in the DL, fine beam selection may be performed and the best UL beam may be updated through beam tracking.

Figure 3:
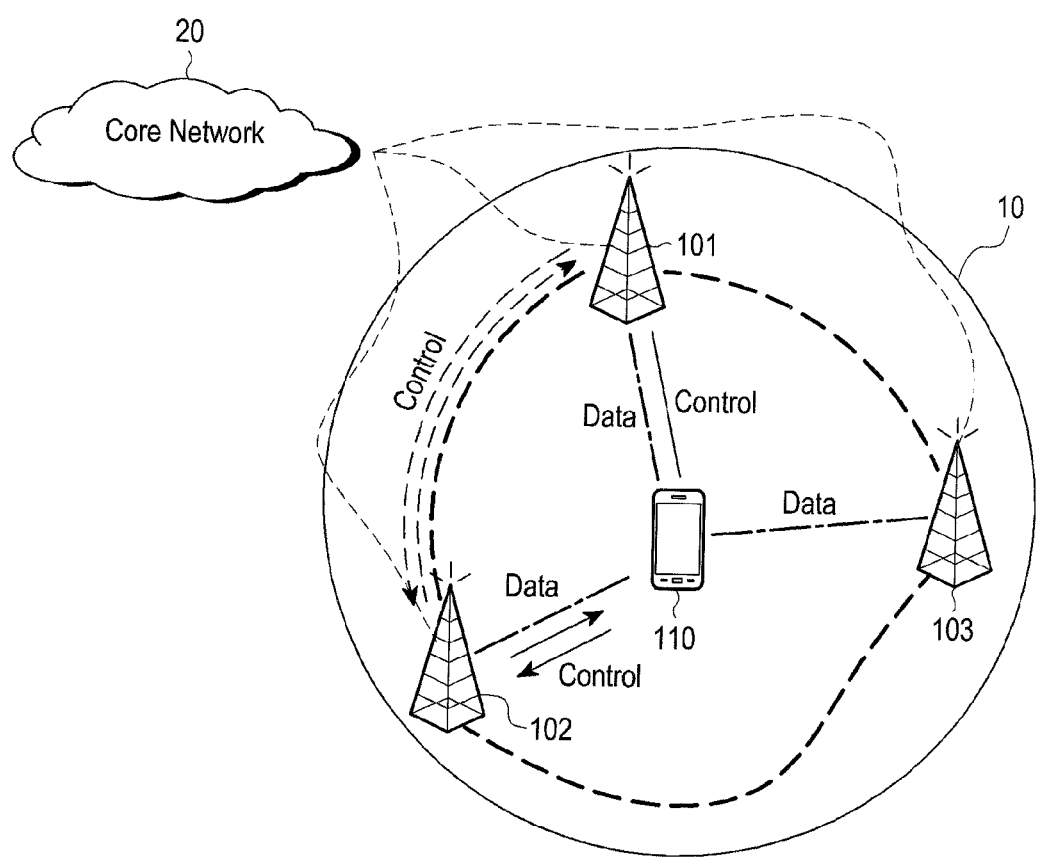
FIG. 3 is a diagram of operations of a cloud master and a wireless terminal in a cloud cell according to an exemplary embodiment of the present invention.

FIG. 3 is a diagram of operations of a cloud master and a wireless terminal in a cloud cell according to an exemplary embodiment of the present invention.

Referring to FIG. 3, the cloud cell 10 includes the multiple base stations 101, 102, and 103. The first base station 101 is the MCM and the second base station 102 is the ACM. The respective base stations 101, 102, and 103 may be connected with an external network through a core network 20.

The wireless terminal 110 is assumed to include two or more Radio Frequency (RF) chains for DL reception and two or more RF chains for UL transmission. When the wireless terminal 110 includes one RF chain for DL reception and one RF chain for UL transmission, the wireless terminal 110 may perform scheduling to receive or transmit a message with a time interval in the same frame, thereby equally operating in the same manner as when the wireless terminal 110 includes two or more RF chains. The operation differs according to the number of RF chains included in the wireless terminal 110, and the MCM may recognize the number of RF chains of the wireless terminal 110 through a capability negotiation step (message transaction).

A method for performing communication between the MCM 101 and the ACM 102 and the wireless terminal 110 in the cloud cell 10 is described below.

The MCM 101 performs every resource scheduling or control signaling, and control information including resource allocation information elements for the resource scheduling or control signaling is transmitted to each base station including the ACM 102. The MCM 101 and the ACM 102 together transmit the control information to the wireless terminal 110. Every determination is made by the MCM 101, but the determination is simultaneously transmitted to the wireless terminal 110 by the MCM 101 and the ACM 102. The simultaneous transmission may indicate, for example, that the MCM 101 and the ACM 102 transmit the same control information in temporally the same frame.

The wireless terminal 110 may simultaneously receive control information from the MCM 101 and the ACM 102 using two or more DL reception chains. Every resource scheduling includes UL resource scheduling as well as DL resource scheduling, such that the MCM 101 and the ACM 102 allocate UL resources for UL control information transmission in their same frame.

The MCM 101 and the ACM 102 allocate UL feedback channels to the wireless terminal 110. Since a channel link state between the wireless terminal 110 and the ACM 102 is different from that between the wireless terminal 110 and the MCM 101, a feedback related to a physical channel (PHY-related feedback) may be processed by each of the MCM 101 and the ACM 102. A UL feedback channel is allocated to the wireless terminal 101 by the MCM 101 in the same frame period for both the MCM 101 and the ACM 102, but a PHY-related feedback message, rather than a general Media Access Control (MAC) layer control message, may be separately processed by each of the MCM 101 and the ACM 102. In this case, the PHY-related feedback is forwarded to the MCM 101, and the MCM 101 may issue a proper command to the ACM 102 based on the PHY-related feedback. For example, the MCM 101 manages control information, and thus the MCM 101 may affect a command, such as a Modulation and Coding Scheme (MCS) level, scheduling information, etc., which is to be used when the ACM 102 forwards the control information to the wireless terminal 110.

The MCM 101 and the ACM 102 may receive UL data (data traffic) like the other base station 103 of the cloud cell 10, but UL data, rather than control signaling, is soft-combined in the MCM 101, such that to identify whether data transmitted in the UL is control information, indication information as shown in Table 1 is included in a UL resource allocation information element. To this end, a connection ID may be used instead of the indication information, or if a control ID for a control message is used in the UL resource allocation information element, the control ID for the control message may be used for the identification.

TABLE 1

| Control | 1 bit | Indicate whether a UL resource is allocated for a control message or for UL data.<br>0: Allocated for a control message<br>1: Allocated for UL data |
|---|---|---|

The MCM 101 may be the base station 101 which first performs initial network entry when the wireless terminal 110 is powered on, and the wireless terminal 110 continuously communicates with the MCM 101. Initial network entry indicates that the wireless terminal 110 completes DL coarse beam selection or DL fine beam selection. One of two or more RF chains of the wireless terminal 110 is used in DL beam selection with the MCM 101. In addition, initial network entry also indicates that one of two or more UL transmission RF chains is used for UL beam selection with the MCM 101. In this state, the ACM 102 is not yet determined, and the ACM 102 may be determined through scanning and updating of the cloud cell 10. Each of the MCM 101 and the ACM 102 or the ACM 102 may be continuously or periodically updated to a base station having better reception signal strength according to the scanning result of the wireless terminal 110.

To prevent the wireless terminal 110 from performing blind scanning, each of the base stations 101, 102, and 103 of the cloud cell 10 may periodically broadcast a list of its neighboring base stations or may provide the neighboring base station list in a unicast manner when the wireless terminal 110 performs network entry. For example, the neighboring base station list may be included in a RaNGing-ReSPonse (RNG-RSP) message or the neighboring base station list may be provided to the wireless terminal 110 through a newly defined unicast message. The base station list may include parameters as shown in Table 2.

TABLE 2

For(i=0; i<N; i++) {
BSID
Preamble ID (cell id)
}

In Table 2, if a midamble has a pre-defined pattern induced by a preamble ID, the wireless terminal 110 may recognize a preamble and a midamble used by a neighboring base station (BSID) through a preamble ID.

The wireless terminal 110 may perform scanning, such as channel measurement, with respect to the neighboring base stations 102 and 103 based on the base station list provided by the MCM 101. In this case, by using the RF chain other than the RF chain used for DL control information reception from the MCM 101 among two or more DL RF chains, the DL beam having the best signal strength is determined through coarse beam selection and fine beam selection with respect to the neighboring base stations 102 and 103. The wireless terminal 110 reports scanning results with respect to the neighboring base stations 102 and 103 to the MCM 101, and a message used to report the scanning results is referred to as a Scan-Report. The Scan-Report message may include at least one parameter shown in Table 3.

TABLE 3

| For(i=0; i<N; i++) { | | |
|---|---|---|
| BSID | 48 bits | Base station's ID |
| DL Beam ID | 8 bits | ID used to identify DL beam having best signal strength |
| Measurement Type | 2 bits | Indicate a type of measurement. For example,<br>0b00: Received Signal Strength Indication (RSSI)<br>0b01: Carrier to Interference and Noise Ratio (CINR) |
| Measurement Result | 8 bits | Indicate a measurement mean with respect to a corresponding base station (BSID) |
| } | | |

The MCM 101 having received the scanning result transmits a cloud cell update message to the wireless terminal 110 to update a list of base stations which form the cloud cell 10, and through cloud cell update, base stations functioning as the MCM 101 and the ACM 102 may be switched. A cloud cell update message may include at least one information field shown in Table 4, and cloud cell update is performed in a frame indicated by "Frame Number to Apply".

TABLE 4

| Frame Number to apply | 24 bits | Indicate timing (frame) at which base station update is to be applied. |
|---|---|---|
| Main Cloud Master Update | | Set to "1" if an MCM requests a wireless terminal to switch an MCM. |
| If(Main Cloud Master Update == 1) {<br>main BSID | 48 bits | Base station ID indicating a base station functioning as a new MCM of a wireless terminal |
| }<br>Auxiliary Cloud Master Update | | Set to "1" when an MCM requests a wireless terminal to switch an ACM. |
| If(Auxiliary Cloud Master Update == 1) {<br>Auxiliary BSID | | Base station ID indicating a base station functioning as a new ACM of a wireless terminal |
| } | | |

TABLE 4-continued

```
Full_or_Partial
If(Full == 1) {                    Indicate that the other base stations
                                   included in a cloud cell, except for an
                                   MCM and an ACM, are included.
For(i=0; i<N; i++) {
BSID                       48 bits Indicate BSID of the other base stations
                                   included in a cloud cell, except for an
                                   MCM and an ACM.

}
} else {                           Used when only a base station included
                                   in a cloud cell, which needs to be
                                   switched, except for an MCM and an
                                   ACM, is included
For(i=0; I < M; i++) {
BSID                       48 bit  Indicate BSID of a base station which
                                   needs to be switched.
ACTION                             0b00: Remove this BSID from Cloud
                                   Cell
                                   0b01: Add this BSID to Cloud Cell
                                   0b10: Maintain BSID in Cloud Cell
}
}
```

The base stations 101, 102, and 103 of the cloud cell 10 all need to know the current MCM 101 and ACM 102 prior to a frame indicated by a number of a frame in which cloud cell update is performed, "Frame Number to Apply", such that the MCM 101 forwards the cloud cell update message to the base stations 102 and 103 of the cloud cell 10 prior to the frame indicated by Frame Number to Apply, and may also forward the cloud cell update message to a base station (not shown) to be removed from the cloud cell 10.

Figure 4:
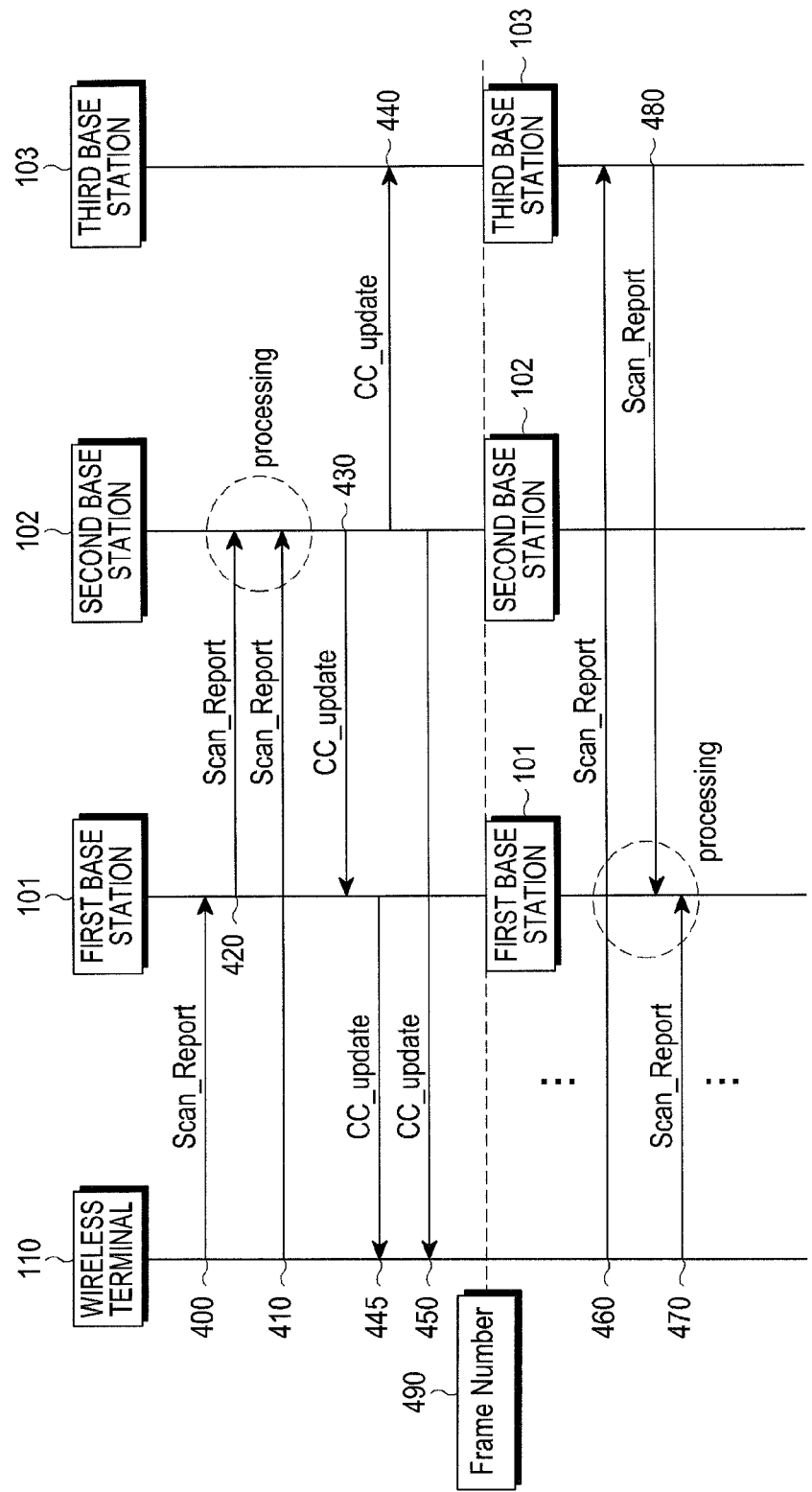
FIG. 4 is a flowchart of a cloud cell update according to an exemplary embodiment of the present invention.

FIG. 4 is a flowchart of a cloud cell update according to an exemplary embodiment of the present invention. In FIG. 4, prior to cloud cell update, the second base station 102 functions as an MCM and the first base station 101 functions as an ACM.

Referring to FIG. 4, the wireless terminal 110 performs scanning with respect to the respective base stations 101, 102, and 103 through the base station list provided by the MCM 102, and transmits a Scan_Report to the MCM 102 and the ACM 101 in steps 400 and 410. The ACM 101 transmits the Scan_Report transmitted from the wireless terminal 110 to the MCM 102 in step 420.

The MCM 102 performs cloud cell update using the Scan_Report and transmits a cloud cell update message to the other base stations 101 and 103 of the cloud cell 10 and the wireless terminal 110 in steps 430, 440, and 450. The ACM 101 transmits the cloud cell update message transmitted from the MCM 102 to the wireless terminal 110 simultaneously with the MCM 102, for example, in temporally the same frame, in step 445.

In the cloud cell update message, to indicate that the MCM is switched to the first base station 101 and the ACM is switched to the third base station 103, "Primary Cloud Master Update" is set to "1", a Primary BSID is set to a BSID of the first base station 101, "Secondary Cloud Master Update" is set to "1", and a Secondary BSID is set to a BSID of the third base station 103.

The respective base stations 101 and 103 having received the cloud cell update message perform update in a frame 490 in which cloud cell update is applied. In the frame 490, the first base station 101 is the MCM, and the third base station 103 is the ACM. Once cloud cell update is performed, the wireless terminal 110 transmits a Scan_Report to the MCM 101 and the ACM 103 in steps 470 and 460, and the ACM 103 transmits Scan_Report received from the wireless terminal 110 to the MCM 101 in step 480.

In FIG. 4, the MCM is determined based on measurement results with respect to the base stations 101, 102, and 103, included in the Scan_Report, but cloud cell update for switching the MCM and the ACM may be performed due to other factors such as load balancing or maintenance.

Figure 5:
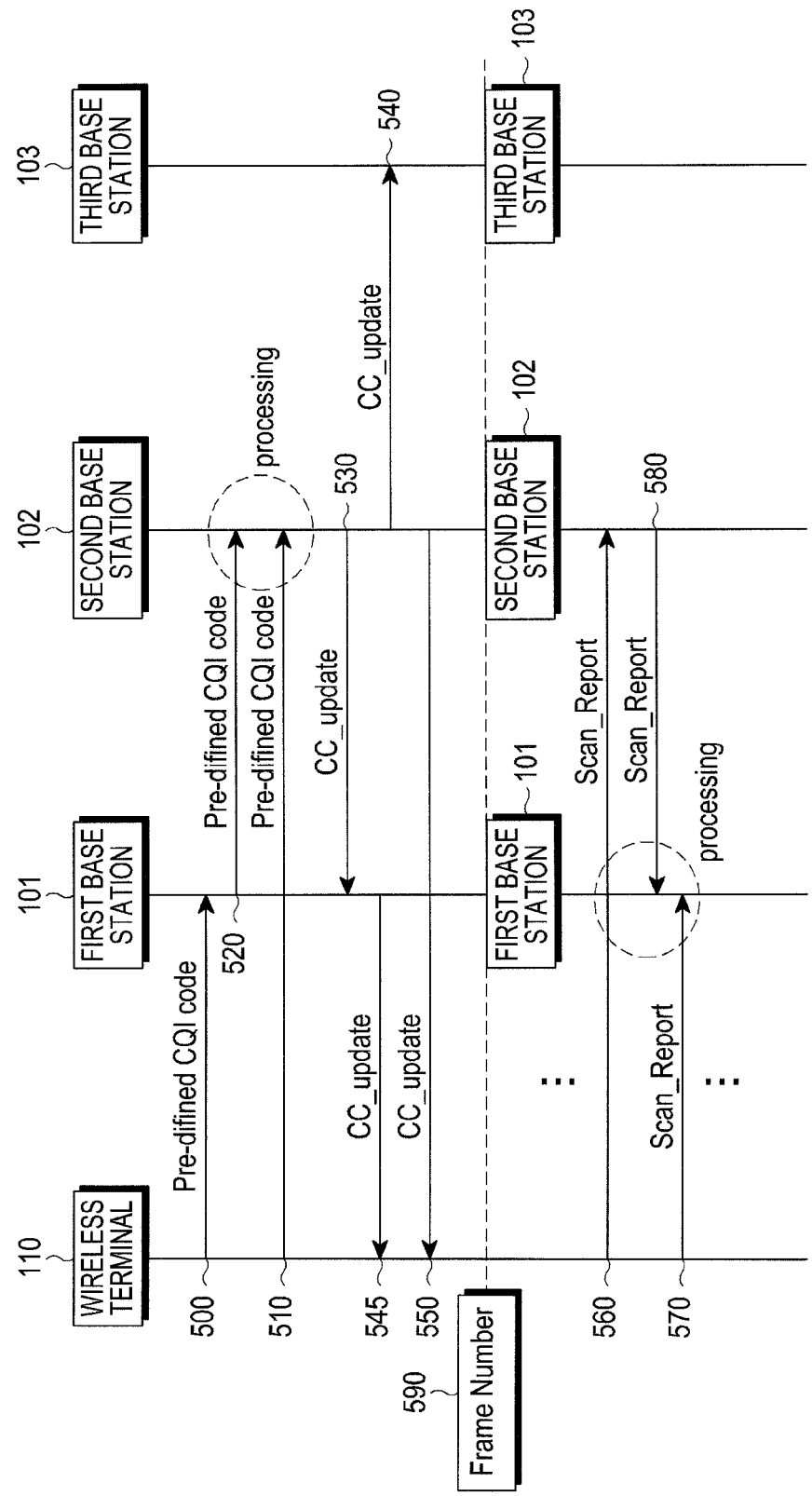
FIG. 5 is a flowchart of a cloud cell update according to another exemplary embodiment of the present invention.

FIG. 5 is a flowchart of a cloud cell update according to another exemplary embodiment of the present invention. In FIG. 5, prior to cloud cell update, the second base station 102 functions as the MCM and the first base station 101 functions as the ACM.

Referring to FIG. 5, once the wireless terminal 110 is allocated with an UL feedback channel, which can carry a Channel Quality Indicator (CQI) code, from the MCM 102 and the ACM 101, the wireless terminal 110 may perform rapid switching between the MCM 102 and the ACM 101 by using a particular CQI code. If DL signal strength of the MCM 102 with respect to the wireless terminal 110 suddenly becomes poor due to sever link fluctuation or the like, the wireless terminal 110 may transmit a pre-defined CQI code for cloud master switching to the ACM 101 and the MCM 102 through a previously allocated feedback channel in steps 500 and 510.

The ACM 101 forwards the received CQI code to the MCM 101 in step 520, and the MCM 102 transmits a cloud cell update message to the base stations 101 and 103 of the cloud cell 10 and the wireless terminal 110 in steps 530, 540, and 550. The ACM 101 transmits the cloud cell update message transmitted from the MCM 102 to the wireless terminal 110 in the same frame as with the MCM 102 in step 545.

In the cloud cell update message, to indicate that the MCM is switched to the first base station 101 and the ACM is switched to the second base station 102, "Primary Cloud Master Update" is set to "1", a Primary BSID is set to a BSID of the first base station 101, "Secondary Cloud Master Update" is set to "1", and a Secondary BSID is set to a BSID of the second base station 102.

The respective base stations 101, 102, and 103 having received the cloud cell update message perform update in a frame 590 in which cloud cell update is applied. In the frame 590, the first base station 101 is the MCM, and the second base station 102 is the ACM. Once cloud cell update is performed, the wireless terminal 110 transmits a Scan_Report to the MCM 101 and the ACM 102 in steps 570 and 560, and the ACM 102 transmits the Scan_Report received from the wireless terminal 110 to the MCM 101 in step 580.

Figure 6:
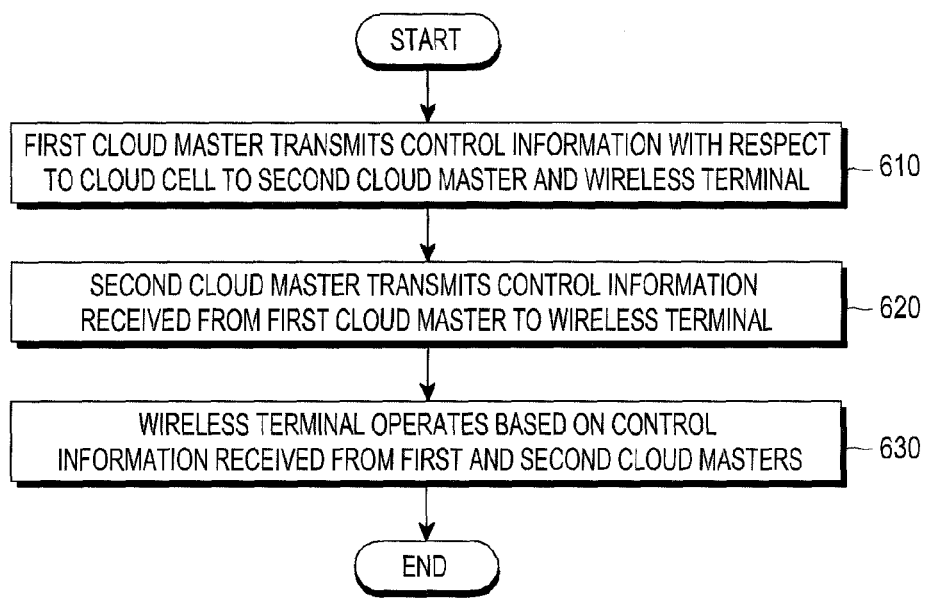
FIG. 6 is a flowchart of a process of transmitting and receiving control information among a main cloud master, an auxiliary cloud master, and a wireless terminal in a cloud cell according to an exemplary embodiment of the present invention.

FIG. 6 is a flowchart of a process of transmitting and receiving control information among an MCM, an ACM, and a wireless terminal in a cloud cell according to an exemplary embodiment of the present invention.

Referring to FIG. 6, once the MCM transmits control information about the cloud cell to the ACM and the wireless terminal in step 610, the ACM transmits the control information received from the MCM to the wireless terminal in step 620. The wireless terminal performs an operation based on the control information received from the MCM and the ACM in step 630.

Figure 7:
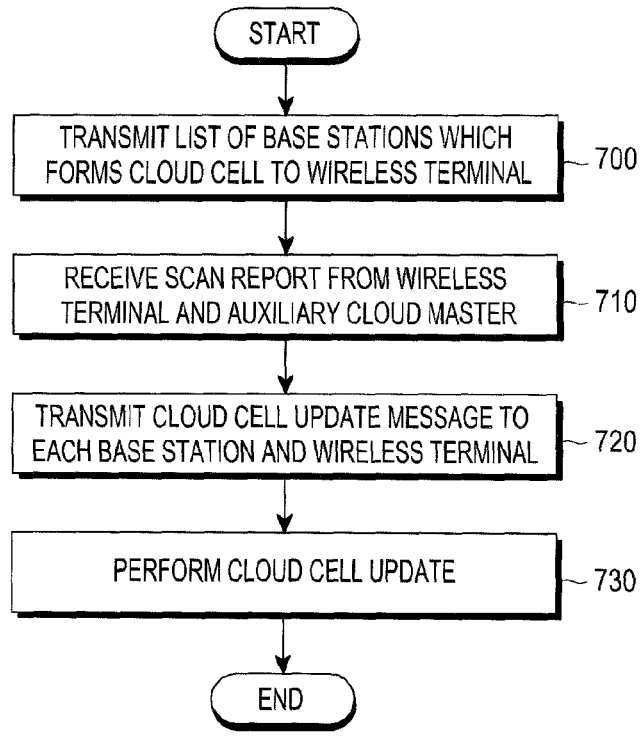
FIG. 7 is a flowchart of a cloud cell update at a main cloud master according to an exemplary embodiment of the present invention.

FIG. 7 is a flowchart of a cloud cell update at an MCM according to an exemplary embodiment of the present invention.

Referring to FIG. 7, after transmitting a list of base stations which form the cloud cell to the wireless terminal in step 700, the MCM receives Scan_Report generated by the wireless terminal through scanning with respect to each base station from the wireless terminal and the ACM in step 710. The MCM generates the cloud cell update message using the received Scan_Report and transmits the cloud cell update message to each base station and the wireless terminal in step 720, and performs cloud cell update in step 730.

Figure 8:
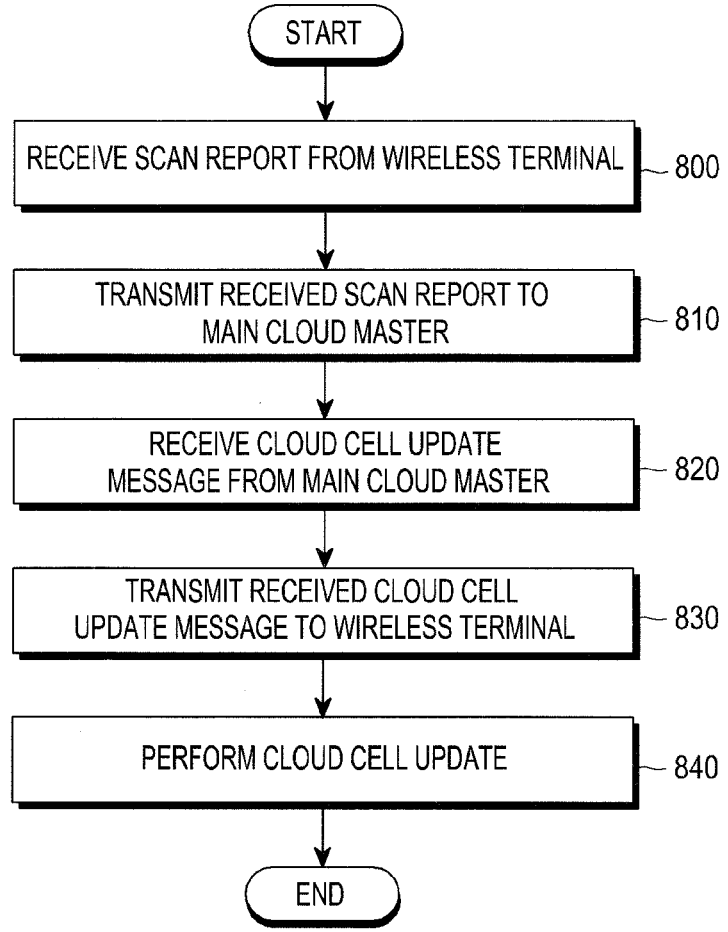
FIG. 8 is a flowchart of a cloud cell update at an auxiliary cloud master according to an exemplary embodiment of the present invention.

FIG. 8 is a flowchart of a cloud cell update at an ACM according to an exemplary embodiment of the present invention.

Referring to FIG. 8, once the ACM receives a Scan_Report generated by the wireless terminal through scanning with respect to each base station from the wireless terminal in step 800, the ACM transmits the received Scan_Report to the MCM in step 810. Upon receiving the cloud cell update message from the MCM in step 820, the ACM transmits the received cloud cell update message to the wireless terminal in step 830 and performs cloud cell update in step 840.

Figure 9:
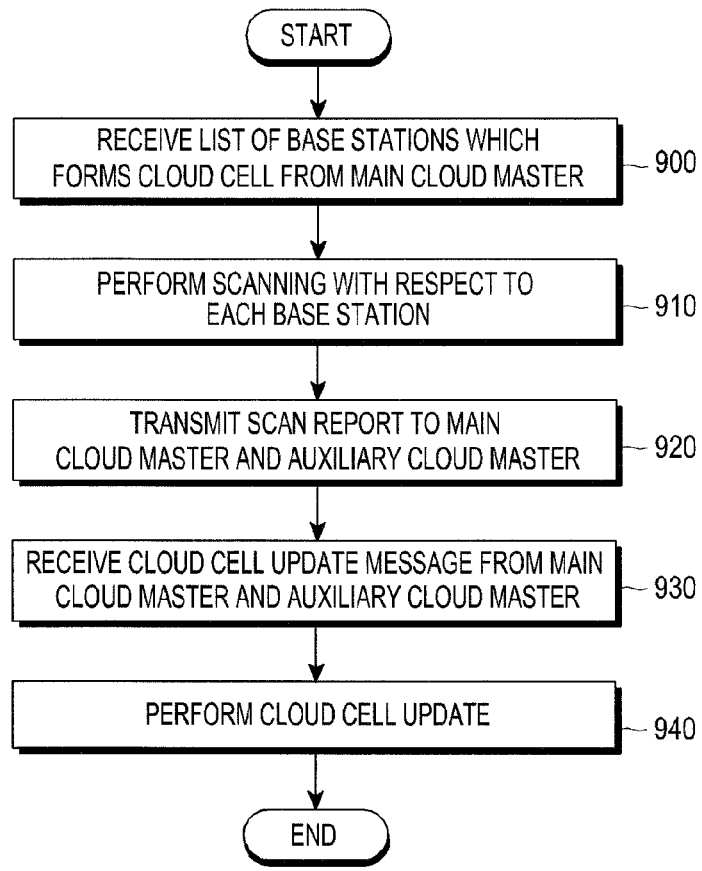
FIG. 9 is a flowchart of a cloud cell update at a wireless terminal according to an exemplary embodiment of the present invention.

FIG. 9 is a flowchart of a cloud cell update at a wireless terminal according to an exemplary embodiment of the present invention.

Referring to FIG. 9, upon receiving a list of base stations which form the cloud cell from the MCM in step 900, the wireless terminal generates a Scan_Report by performing scanning with respect to each base station in step 910. The wireless terminal transmits the generated Scan_Report to the MCM and the ACM in step 920, receives the cloud cell update message from the MCM and the ACM in step 930, and performs cloud cell update in step 940. In FIG. 9, the wireless terminal receives the list of base stations which form the cloud cell from the MCM and operates, but the wireless terminal may receive the list of base stations which form the cloud cell from the ACM as well as the MCM, and may receive the list of base stations which form the cloud cell simultaneously from the MCM and the ACM.

Figure 10:
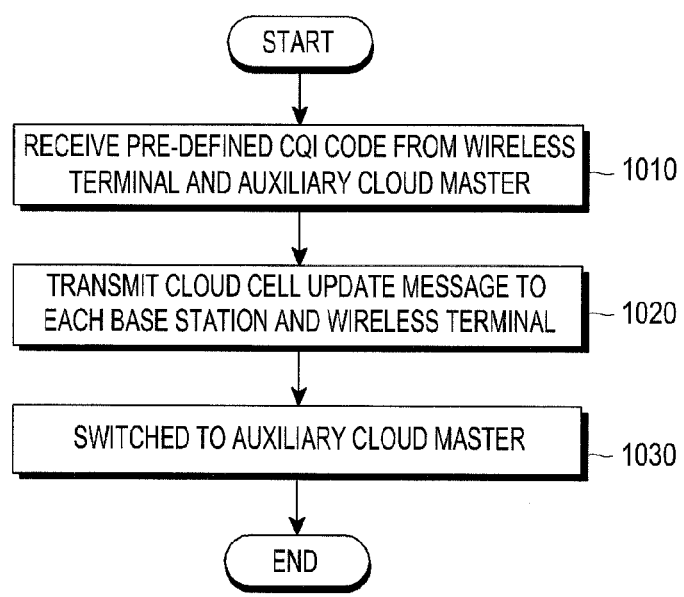
FIG. 10 is a flowchart of a cloud cell update at a main cloud master according to another exemplary embodiment of the present invention.

FIG. 10 is a flowchart of a cloud cell update at an MCM according to another exemplary embodiment of the present invention.

Referring to FIG. 10, upon receiving a pre-defined CQI code from the wireless terminal and the ACM in step 1010, the MCM transmits the cloud cell update message for switching the MCM and the ACM to each base station and the wireless terminal in step 1020. The MCM is switched to the ACM in step 1030.

Figure 11:
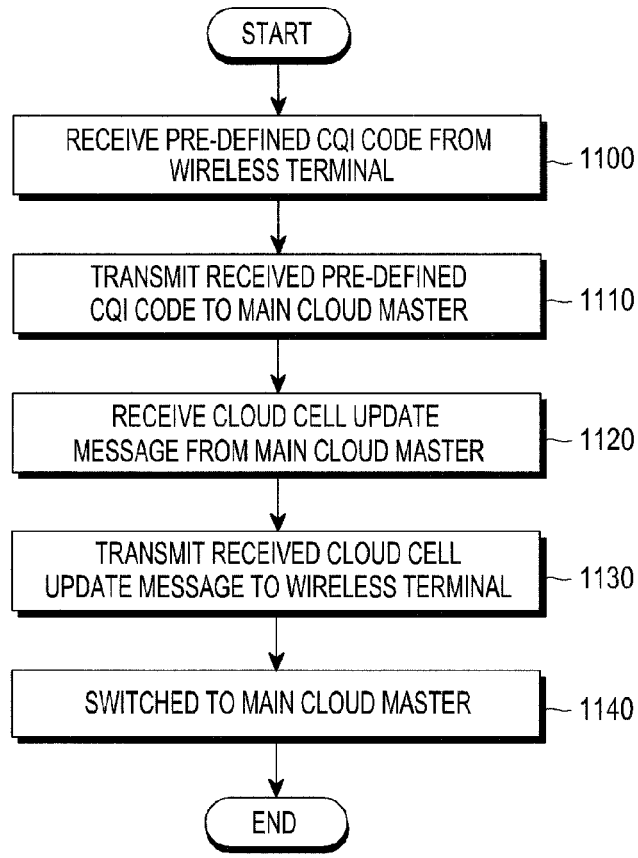
FIG. 11 is a flowchart of a cloud cell update at an auxiliary cloud master according to another exemplary embodiment of the present invention.

FIG. 11 is a flowchart of a cloud cell update at an ACM according to another exemplary embodiment of the present invention.

Referring to FIG. 11, upon receiving a pre-defined CQI code from the wireless terminal in step 1100, the ACM transmits the received pre-defined CQI code to the MCM in step 1110. Upon receiving the cloud cell update message for switching the MCM and the ACM from the MCM in step 1120, the ACM transmits the received cloud cell update message to the wireless terminal 1130 and the ACM is switched to the MCM in step 1140.

Figure 12:
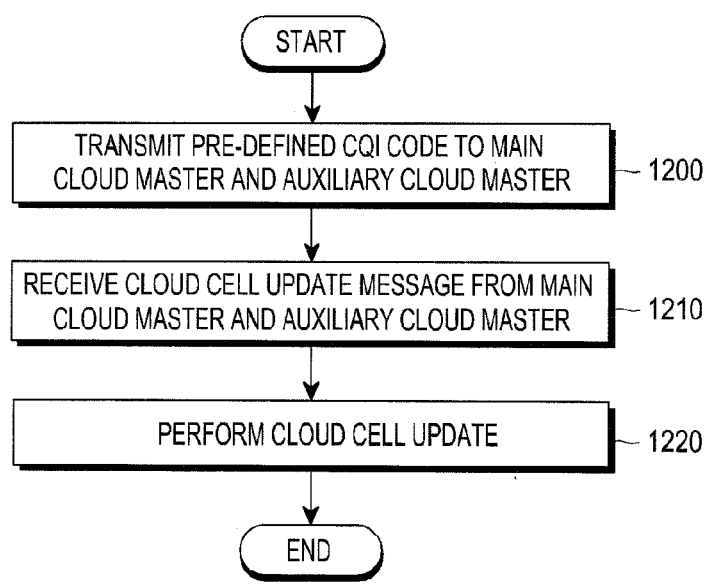
FIG. 12 is a flowchart of a cloud cell update at a wireless terminal according to another exemplary embodiment of the present invention.

FIG. 12 is a flowchart of a cloud cell update at a wireless terminal according to another exemplary embodiment of the present invention.

Referring to FIG. 12, after transmitting a pre-defined CQI code to the MCM and the ACM in step 1200, the wireless terminal receives the cloud cell update message for switching the MCM and the ACM to each other from the MCM and the ACM in step 1210, and performs cloud cell update for switching the MCM and the ACM to each other in step 1220.

Figure 13:
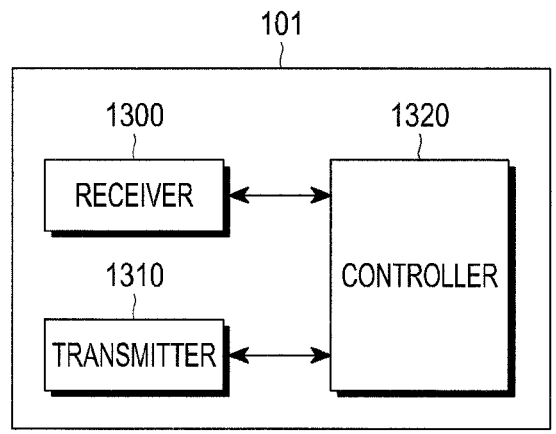
FIG. 13 is a block diagram of a base station according to an exemplary embodiment of the present invention.

FIG. 13 is a block diagram of a base station according to an exemplary embodiment of the present invention. Each of the base stations 101, 102, 103, and 104 of the cloud cell 10 may include the components shown in FIG. 13.

Referring to FIG. 13, the base station 101 may include a receiver 1300, a transmitter 1310, and a controller 1320. The receiver 1300 receives a signal from the wireless terminal 110 or the other base stations 102, 103, and 104, and the transmitter 1310 transmits a signal to the wireless terminal 110 or the other base stations 102, 103, and 104. The controller 1320 controls the base station 101 according to a function executed by the base station 101, such as scheduling with respect to the wireless terminal 110, an operation related to update of the cloud cell 10, etc. The controller 1320 controls the base station 101 to perform the various operations described above.

Figure 14:
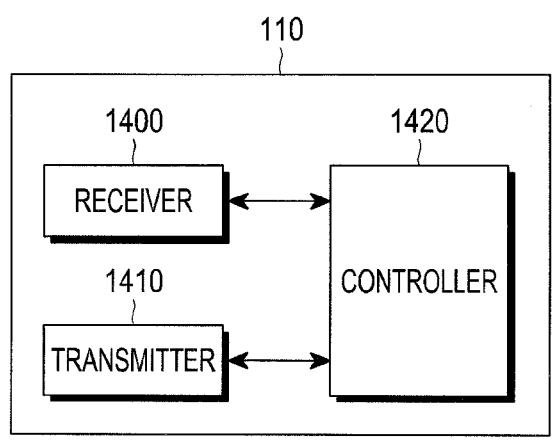
FIG. 14 is a block diagram of a wireless terminal according to an exemplary embodiment of the present invention.

FIG. 14 is a block diagram of a wireless terminal according to an exemplary embodiment of the present invention.

Referring to FIG. 14, the wireless terminal 110 may include a receiver 1400, a transmitter 1410, and a controller 1420. The receiver 1400 receives a signal from the base stations 101, 102, 103, and 104, and the transmitter 1410 transmits a signal to the base stations 101, 102, 103, and 104. The controller 1420 controls the wireless terminal 110, such as scanning with respect to the respective base stations 101, 102, 103, and 104. The controller 1420 controls the wireless terminal 110 to perform the various operations described above.

According to exemplary embodiments of the present invention, by dualizing a base station which transmits control information to a wireless terminal, the wireless terminal can receive the control information from the base station without any loss, thereby achieving safe communication between the base station and the wireless terminal.

According to exemplary embodiments of the present invention, the base station which transmits control information to the wireless terminal can be adaptively changed, thereby achieving safe communication between the base station and the wireless terminal.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting control information in a wireless communication system, the method comprising:
    transmitting, by a first serving base station (BS), information associated with a plurality of BSs to a terminal and at least one second serving BS;
    receiving, by the first serving BS, channel information associated with the plurality of BSs from at least one of the terminal and the at least one second serving BS; and transmitting, by the first serving BS, control information to the terminal and the at least one second serving BS, wherein the at least one second serving BS transmits the control information to the terminal, wherein the control information includes information, determined based on the channel information associated with the plurality of BSs, related to a change of an operation of the first serving BS and the at least one second serving BS.

2. The method of claim 1, wherein the control information includes information related to a frame at which the change of operation is to be applied.

3. The method of claim 1, wherein the information related to a change of an operation includes information about whether the operation of the first serving BS is replaced with the at least one second serving BS.

4. The method of claim 1,
wherein the information associated with the plurality of BSs includes an Identification (ID) of the first serving BS and an ID of the at least one second serving BS.

5. The method of claim 4, wherein the channel information includes a pre-defined channel quality indicator (CQI) code.

6. The method of claim 4, wherein the control information is transmitted to the terminal from the first serving BS and the at least one second serving BS at the same time.

7. A method for receiving control information in a wireless communication system, the method comprising:

receiving, by a terminal, information associated with a plurality of base stations (BSs) from a first serving BS and at least one second serving BS;

generating, by the terminal, channel information for each of the plurality of BSs based on the received information associated with the plurality of BSs;

transmitting, by the terminal, the channel information for each of the plurality of BSs to the first serving BS and the at least one second serving BS; and receiving, by the terminal, control information from the first serving BS and the at least one second serving BS, wherein the control information includes information, determined based on the channel information, related to a change of an operation of the first serving BS and the at least one second serving BS.

8. The method of claim 7, wherein the control information includes information related to a frame at which the change of operation is to be applied.

9. The method of claim 7, wherein the information related to a change of an operation includes information about whether the operation of the first serving BS is replaced with the at least one second serving BS.

10. The method of claim 7,
wherein the information associated with the plurality of BSs includes an Identification (ID) of the first serving BS and an ID of the at least one second serving BS.

11. The method of claim 10, wherein the channel information includes a pre-defined channel quality indicator (CQI) code.

12. The method of claim 7, wherein the control information is received from the first serving BS and the at least one second serving BS at the same time.

13. A method for transmitting control information in a wireless communication system, the method comprising:

receiving, by a second serving base station (BS), information associated with a plurality of BSs from a first serving BS;

transmitting, by the second serving BS, the information associated with the plurality of BSs to a terminal;

receiving, by the second serving BS, channel information associated with the plurality of BSs from the terminal;

transmitting, by the second serving BS, the channel information associated with the plurality of BSs to the first serving BS;

receiving, by the second serving BS, control information from the first serving BS; and transmitting, by the second serving BS, the control information to the terminal, wherein the control information includes information, determined based on the channel information associated with the plurality of BSs, related to a change of an operation of the first serving BS and the second serving BS and at least one other second serving BS.

14. The method of claim 13, wherein the control information includes information related to a frame at which the change of operation is to be applied.

15. The method of claim 13, wherein the information related to a change of an operation includes information about whether the operation of the first serving BS is replaced with the second serving BS and the at least one other second serving BS.

16. The method of claim 13,
wherein the information associated with the plurality of BSs includes an Identification (ID) of the first serving BS, an ID of the second serving BS, and an ID of the at least one other second serving BS.

17. The method of claim 16, wherein the channel information includes a pre-defined channel quality indicator (CQI) code.

18. The method of claim 13, wherein the control information is transmitted to the terminal by the second serving BS within a same time at which the first serving BS transmits the control information to the terminal.

19. A first serving base station (BS) for transmitting control information in a wireless communication system, the first serving BS comprising:

a transceiver configured to:
transmit information associated with a plurality of BSs to a terminal and at least one second serving BS,
receive channel information associated with the plurality of BSs from at least one of the terminal and the at least one second serving BS, and
transmit control information to the terminal and the at least one second serving BS, wherein the at least one second serving BS transmits the control information to the terminal, wherein the control information includes information, determined based on the channel information associated with the plurality of BSs, related to a change of an operation of the first serving BS and the at least one second serving BS.

20. The first serving BS of claim 19, wherein the control information includes information related to a frame at which the change of operation is to be applied.

21. The first serving BS of claim 19, wherein the information related to a change of an operation includes information about whether the operation of the first serving BS is replaced with the at least one second serving BS.

22. The first serving BS of claim 19,
wherein the information associated with the plurality of BSs includes an Identification (ID) of the first serving BS and an ID of the at least one second serving BS.

23. The first serving BS of claim 22, wherein the channel information includes a pre-defined channel quality indicator (CQI) code.

24. The first serving BS of claim 19, wherein the control information is transmitted to the terminal from the first serving BS and the at least one second serving BS at the same time.

25. A terminal for receiving control information in a wireless communication system, the terminal comprising:
    a transceiver configured to:
        receive information associated with a plurality of base stations (BSs) from a first serving BS and at least one second serving BS,
        generate channel information associated with each of the plurality of BSs based on the information associated with the plurality of BSs,
        transmit the channel information to the first serving BS and the at least one second serving BS, and
        receive control information from the first serving BS and the at least one second serving BS,
    wherein the control information includes information, determined based on the channel information, related to a change of an operation of the first serving BS and the at least one second serving BS.

26. The terminal of claim 25, wherein the control information includes information related to a frame at which the change of operation is to be applied.

27. The terminal of claim 25, wherein the information related to a change of an operation includes information about whether the operation of the first serving BS is replaced with the at least one of the second serving BS.

28. The terminal of claim 25,
    wherein the information associated with the plurality of BSs includes an Identification (ID) of the first serving BS and an ID of the at least one second serving BS.

29. The terminal of claim 28, wherein the channel information includes a pre-defined channel quality indicator (CQI) code.

30. The terminal of claim 25, wherein the control information is received from the first serving BS and the at least one second serving BS at the same time.

31. A second serving base station (BS) for transmitting control information in a wireless communication system, the method comprising:
    a transceiver configured to:
        receive information associated with a plurality of BSs from a first serving BS,
        transmit the information associated with the plurality of BSs to a terminal,
        receive channel information associated with the plurality of BSs from the terminal,
        transmit the channel information associated with the plurality of BSs to the first serving BS,
        receive control information from the first serving BS, and
        transmit the control information to the terminal,
    wherein the control information includes information, determined based on the channel information, related to a change of an operation of the first serving BS and the second serving BS and at least one other second serving BS.

32. The second serving BS of claim 31, wherein the control information includes information related to a frame at which the change of operation is to be applied.

33. The second serving BS of claim 31, wherein the information related to a change of an operation includes information about whether the operation of the first serving BS is replaced with the second serving BS and the at least one other second serving BS.

34. The second serving BS of claim 31,
    wherein the information associated with the plurality of BSs includes an Identification (ID) of the first serving BS, an ID of the second serving BS, and an ID of the at least one other second serving BS.

35. The second serving BS of claim 34, wherein the channel information includes a pre-defined channel quality indicator (CQI) code.

36. The second serving BS of claim 31, wherein the control information is transmitted from the second serving BS to the terminal at the same time at which the first serving BS transmits the control information to the terminal.

\* \* \* \* \*